(12) United States Patent
Poulis et al.

(10) Patent No.: US 6,456,665 B1
(45) Date of Patent: Sep. 24, 2002

(54) PARTIAL MODIFICATION OF A NOMINAL IMPEDANCE USING DIGITAL IMPEDANCE SYNTHESIS

(75) Inventors: Sprio Poulis, Salt Lake City; Shayne Messerly, Farmington; John Evans, Riverton, all of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/321,957

(22) Filed: May 28, 1999

(51) Int. Cl.$^7$ ................................................ H04B 3/08
(52) U.S. Cl. ........................................................ 375/257
(58) Field of Search ................................. 375/257, 258, 375/220, 222; 379/377, 399; 333/32

(56) References Cited

U.S. PATENT DOCUMENTS

| | | | |
|---|---|---|---|
| 4,395,590 A | | 7/1983 | Pierce et al. ............... 379/93.36 |
| 4,456,991 A | * | 6/1984 | Chea, Jr. et al. ............. 370/359 |
| 5,017,878 A | * | 5/1991 | Nave .......................... 324/613 |
| 5,181,240 A | | 1/1993 | Sakuragi et al. ........... 379/93.36 |
| 5,528,131 A | | 6/1996 | Marty et al. ................. 323/238 |
| 5,790,656 A | | 8/1998 | Rahamin et al. ........ 379/399.01 |
| 5,809,068 A | | 9/1998 | Johnson ....................... 375/222 |
| 5,815,567 A | | 9/1998 | Davis et al. ................. 379/377 |

\* cited by examiner

*Primary Examiner*—Mohammad H. Ghayour
(74) *Attorney, Agent, or Firm*—Workman, Nydegger & Seeley

(57) ABSTRACT

A circuit is provided for creating a termination impedance which matches a characteristic impedance. The characteristic impedance of a system or network is matched by placing a nominal impedance across the transmission line. The difference between the nominal impedance and the characteristic impedance is synthesized such that the synthesized or generated impedance is in parallel with the nominal impedance. The parallel combination of the nominal impedance and the generated impedance produces a termination impedance which substantially matches the characteristic impedance. The generated impedance is created by sensing a voltage and scaling that voltage by a factor related to the nominal and characteristic impedances. The scaled voltage controls a current source which produces a current having a value related to the inverse of the impedance. The ration of the sensed voltage and the generated current is the impedance which, when combined with the nominal impedance, produces the desired termination impedance. In this manner, the characteristic impedance of the source is matched by the altered nominal impedance.

25 Claims, 2 Drawing Sheets

PARTIAL MODIFICATION OF A NOMINAL IMPEDANCE USING DIGITAL IMPEDANCE SYNTHESIS

BACKGROUND OF THE INVENTION

1. Field of the Invention

The present invention relates to the termination of line impedances. More specifically, the present invention relates to terminating line impedances by modifying a nominal impedance using digital impedance synthesis.

2. Present State of the Art

As technology increases around the world, more and more people are using computers and computer related hardware for entertainment, personal and business reasons. Computers also allow persons from remote locations to communicate with other remotely located individuals or businesses. These communications can occur over the internet, via satellite communication or over telephone networks.

As the need for global communication has increased, the technology which permits such communication has also advanced. The problem is that different countries have not agreed on any single standard. For example, virtually every country has a telephone system or network. Each telephone network, unfortunately, is designed a bit differently. This is evident from the electrical characteristics which partly define such systems. One important characteristic is the nominal or characteristic impedance. The characteristic impedance is usually defined in ohms, but is actually a complex impedance and each country has typically designated a different characteristic impedance for their telephone system.

This may not appear to be a problem, but it can have a significant impact on computer, as well as voice, communications. The reason for this impact is related to how a signal is transmitted over a telephone line. A computer using a modem, for example is seen as a signal source because it is transmitting a signal to some telephone network. If the impedance of the modem does not match the impedance of the telephone network, the transmitted signal is reflected back to the modem. In fact, the signal bounces back and forth between the modem and the telephone network until it is attenuated. This signal reflection can cause problems for the telephone network receiving the modem transmission because the reflected signal is superimposed upon the transmitted signal.

When a person is talking on the telephone, an echo may be heard and the conversation is difficult to follow and understand. Similarly, the telephone network receiving the modem transmission has a difficult time hearing the modem signal. This problem is exacerbated by the fact that a modem is transmitting at higher speeds and frequencies. In order to avoid errors, the entity receiving the transmission must ensure that the reflected signal is removed before the transmitted or received signal can be interpreted or decoded. This has an impact on the speed of the transmission and can affect the integrity of the signal.

One solution to the above problem is to physically include more than one impedance on a modem card and cause the modem card, using switching technologies, to select the impedance that matches the characteristic impedance of the telephone network that is connected to the modem. While this solution can work, there are several problems. First, there are many telephone systems, and a great deal of printed circuit board surface area will be required to install all of the necessary impedances. This problem is much more significant with cards conforming to PCMCIA standards, where printed circuit board surface area is very limited. Second, the nominal impedance of the telephone network may be altered because of the length of the transmission line and other factors. Another attempted solution is to place no impedance across the transmission line. Instead, the entire impedance is generated. This solution is unacceptable from a performance standpoint in part because of the signal transients and reflections which are present before the impedance can be generated.

This problem is not limited to telephone networks, but can apply to any situation needing an impedance which is not always constant or where an impedance should be matched. It is desirable to have a circuit or impedance capable of adjusting to different impedances and impedance variations.

OBJECTS AND SUMMARY OF THE INVENTION

It is therefore an object of one embodiment of the present invention to create a termination impedance by adapting a nominal impedance such that the characteristic impedance of a system is terminated and matched.

It is another object of one embodiment of the present invention to modify an impedance which terminates a line.

It is a further object of one embodiment of the present invention to generate an impedance, which when combined with a termination impedance, matches the characteristic impedance of the transmission line.

It is yet another object of one embodiment of the present invention to be able to match the characteristic impedance of a transmission line by generating an impedance.

In summary, one embodiment of the present invention functions to terminate a line by matching the impedance of the source, which may be a telephone network. An effective solution is to physically place a nominal impedance across the transmission line. This nominal impedance may match the characteristic impedance of a system or network. In order to match the characteristic impedances of other systems or telephone networks, an impedance is generated such that when combined with the nominal impedance, a termination impedance is produced which substantially matches the characteristic impedance of the system or network.

The impedance to be generated is easily found because the characteristic impedance and the nominal impedance are both known impedances. The generated impedance is created by sensing the voltage present on the transmission line of the system and converting that voltage to its digital equivalent. The digital equivalent is processed and scaled with a digital signal processor that has an impedance generator implemented in software that alters the digital voltage by some factor. The output of the digital signal processor is converted to an analog voltage and connected to a voltage controlled current source. The voltage which controls the current source creates a current. The voltage of the transmission line divided by the generated current equals the generated impedance. The generated impedance is typically connected across the transmission line in parallel with the nominal impedance. In this manner, the generated impedance, in combination with the nominal impedance, creates a termination impedance which substantially matches the characteristic impedance of the telephone network. Other embodiments of the present invention can be used in any system where a line is terminated or in systems where an impedance must be altered or generated.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention matches, in one embodiment, a characteristic impedance by placing a nominal impedance across a transmission line and by placing an impedance synthesis circuit in parallel with the nominal impedance. The parallel configuration forms a termination impedance which substantially matches the characteristic impedance of a system or telephone network. By adapting or partially modifying a nominal impedance to match a characteristic impedance data can be effectively and efficiently transferred across systems and telephone networks.

Many systems have different characteristic impedances, which implies that any device must have a plurality of termination impedances in order to communicate with each system. Because of the size of the components and the surface area of the printed circuit boards required for those components as well as the need to switch between different impedances, this approach is not practical. By generating an impedance, which effectively alters the nominal impedance because the generated impedance is in parallel with the nominal impedance, the characteristic impedances of many different systems can be substantially matched.

Figure 1:
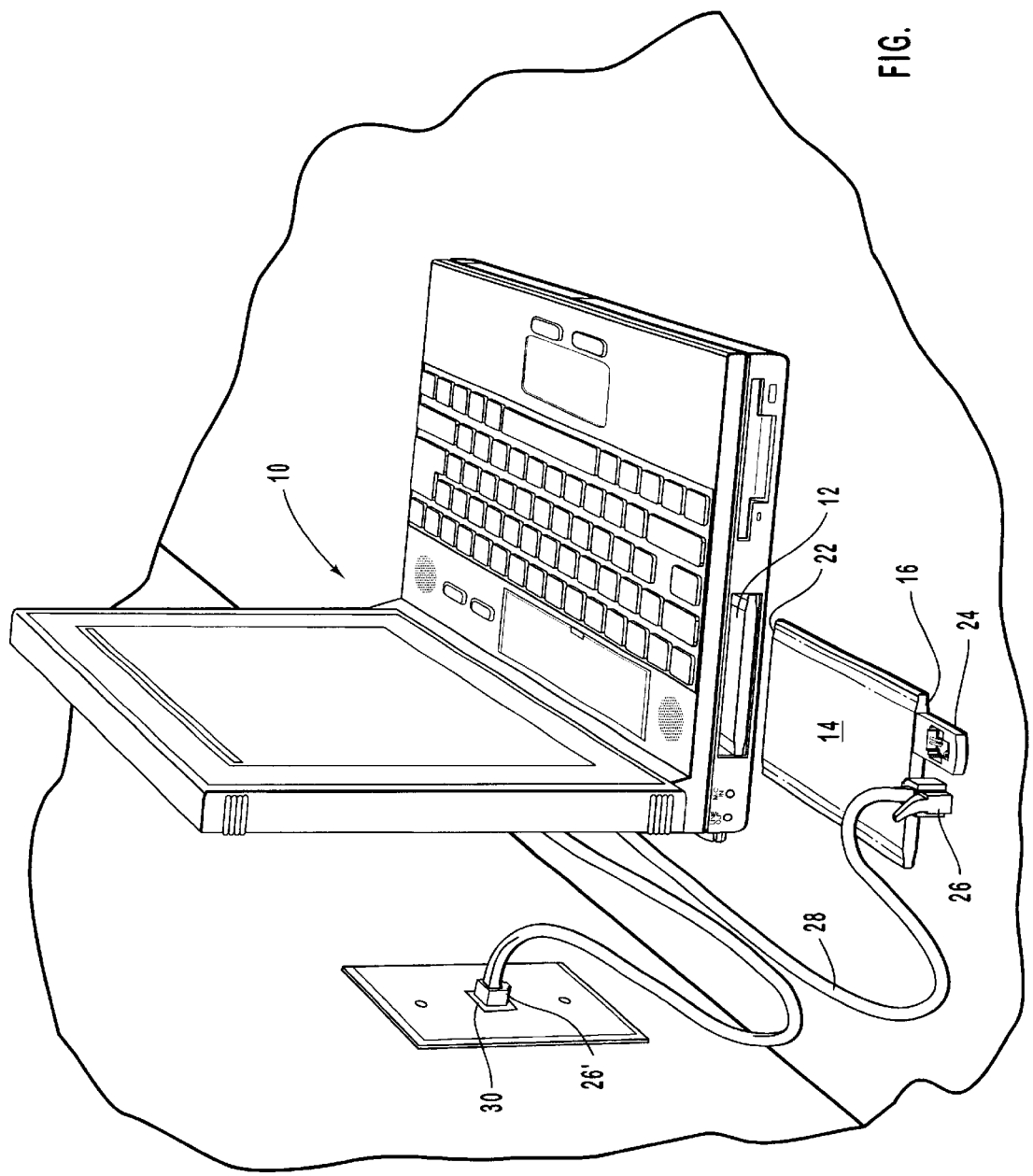
FIG. 1 is a diagram of a system implementing one embodiment of the present invention.

Illustrated in FIG. 1 is a system or environment in which the present invention may be utilized or implemented. FIG. 1 illustrates a portable computer 10 having a PCMCIA compliant slot 12. Slot 12 is configured to receive PCMCIA compliant card 14. Card 14 may be a modem for connecting to the public telephone network, a network interface card for connecting with an ethernet or other computer network, or any other card. Interface 22 of card 14 is configured to detachably mate with a connector (not shown) inside slot 12. In this manner, card 14 is connected to computer 10. The present invention may be implemented in other systems and networks and FIG. 1 is illustrative of one type of system and is not to be construed as limiting.

Card 14 also comprises connector 14. Connector 14 is illustrated as an RJ type connector, but may be of any type including a 15-pin connector or a coaxial cable connector. Connector 24 is configured to removably receive cable 28 and plug 26 assembly, by having plug removably inserted in connector 24. The other end of cable 28 comprises plug 26', which is configured to detachably mate with jack 30. Jack 30 is typically connected to a telephone network, or a private branch exchange (PBX) system, or any type of computer network. In this manner, computer 10 and more specifically, card 14 is capable of communication with the network to which jack 30 connects.

Figure 2:
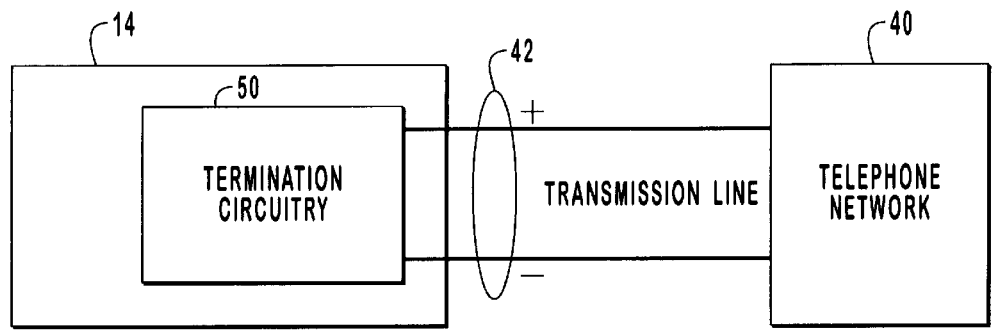
FIG. 2 a block diagram of a system having termination circuitry implementing one embodiment of the present invention.

The remaining Figures are discussed with card 14 functioning as a modem. It is understood however, that the present invention, as described herein, can apply to any system, device or circuit, including telephone networks, computer networks, two port circuits and other configurations. FIG. 2 illustrates a telephone network 40, which transmits data over a transmission line 42. Transmission line 42 typically comprises two wires and may be used for both receiving and transmitting data. In some other networks, notably ethernet networks, transmission line 42 may comprise more than one wire pair. In a telephone network, transmission line 42 is frequently referred to as tip and ring. Card 14 connects to telephone network 40 as illustrated in FIG. 1 and card 14 has interface circuitry 50.

In order to effectively interface with telephone network 40, card 14 should meet several requirements. For instance, data transmission preferably occurs when the impedance of a source, such as telephone network 40, is matched by the impedance of a device, such as card 14. The impedance of the source is referred to herein as the characteristic impedance and, with regard to telephone networks and other systems, may include the impedance of the transmission line as well as the impedance actually specified for the system. Nominal impedance, as used herein, refers to a physical impedance which is placed across a transmission line. Termination impedance, as used herein, refers to the parallel combination of the nominal impedance and a generated impedance.

For a given telephone network, a characteristic impedance Z is specified. Thus, card 14 must match that impedance to maximize the quality and rate of data transmission. If card 14 does not match the characteristic impedance specified by telephone network 40, then signal reflections may be present in transmission line 42. If reflections are present, then the task of interpreting the transmitted data becomes much more difficult and in some cases impossible. The reason for this is that the reflected signal is superimposed upon the transmitted signal, which effectively alters the content or information contained therein.

The need to match impedances is evident in telephone systems because different countries specify different characteristic impedances. If card 14 is designed with a single impedance, then signal reflections are practically guaranteed. However, because card 14 complies with the PCMCIA standards, it is not practical to physically place all of the different characteristic impedances specified by the various countries.

Figure 3:
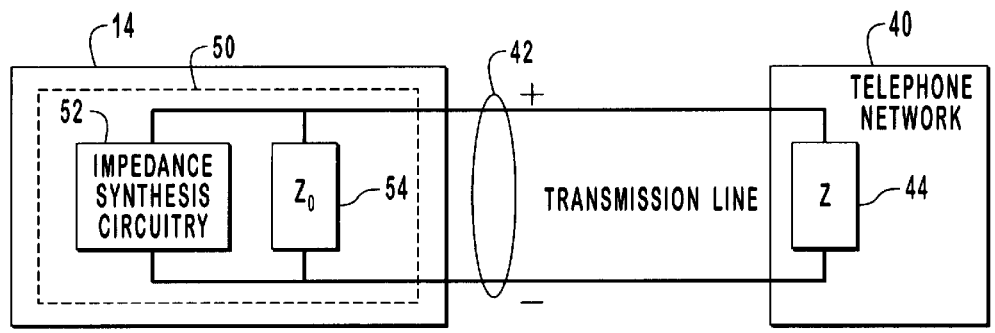
FIG. 3 is a block diagram of an impedance generator circuit for adjusting the impedance of a device.

FIG. 3 illustrates how this can be overcome without having to physically place all the impedances required by the multiple telephone networks on card 14. Termination circuitry 50 permits card 14 or other device to effectively match characteristic impedance Z 44 of telephone network 44. Termination circuitry 50 comprises nominal impedance $Z_o$ 54 and impedance synthesis circuitry 52. Nominal impedance $Z_o$ 54 is a physical impedance which is may be placed across transmission line 42. Nominal impedance $Z_o$ 54 is preferably a permanent part of card 14 and may comprise passive circuit elements including resistors, capacitors and inductors.

Telephone network 40, to which card 14 may be connected has a characteristic impedance Z 44. In some cases, characteristic impedance Z 44 may be equal to nominal impedance $Z_o$ 54. In a majority of cases, however, nominal impedance $Z_o$ 54 will not be equal to characteristic impedance Z 44, which indicates that nominal impedance $Z_o$ 54 must be changed or altered such that the impedances are matched.

To this end, FIG. 3 also illustrates impedance synthesis circuitry 52. Nominal impedance $Z_o$ 54 is designed to terminate at least one transmission line 42. If telephone network 40 has a characteristic impedance Z 44, which may include the impedance of transmission line 42, then the impedance necessary to terminate telephone network 40 and transmission line 42 has a value of nominal impedance $Z_o$ 54 plus an impedance dZ, where dZ represents the amount by which nominal impedance $Z_o$ 54 needs to be modified such that $dZ+Z_o$ is equivalent to characteristic impedance Z 44. As stated previously, nominal impedance $Z_o$ 54 cannot be physically altered because it is impractical to add additional circuit elements. Thus the impedance dZ must be converted to an impedance which is placed in parallel with nominal impedance $Z_o$ 54.

If a voltage V is present across transmission line 42, then the currents corresponding to nominal impedance $Z_o$ 54 and characteristic impedance Z 44 are:

$$I_o = V/Z_o \quad (1)$$

and $$I = V/Z \quad (2)$$

respectively. The difference current dI, which flows through impedance synthesis circuitry 52 is:

$$dI = V/Z - V/Z_o \text{ or } V[(1/(Z_o+dZ))-1/Z_o] \quad (3)$$

which reduces to:

$$dI = V/[(Z)(Z_o)/dZ]. \quad (4)$$

Thus, the impedance $(Z)(Z_o)/dZ$ is generated by impedance synthesis circuitry 52 such that the overall impedance presented to telephone network 40 by card 14 matches characteristic impedance Z 44 of telephone network 40. In other words, the parallel combination of nominal impedance $Z_o$ 54 and the impedance generated or created by impedance synthesis circuitry 52 matches characteristic impedance Z 44. One advantage of the present invention is the capability of matching characteristic impedance Z 44 without the need for additional resistors or capacitors. Impedance synthesis circuitry 52 has the capacity to generate a plurality of impedances, depending on the value of characteristic impedance Z 44. In other words, the need to physically place the impedances required by all telephone networks on card 14 is eliminated because impedance synthesis circuitry 52 permits card 14 to match all those different impedances. Impedance synthesis circuitry 52 is an example of means for scaling an input voltage.

Figure 4:
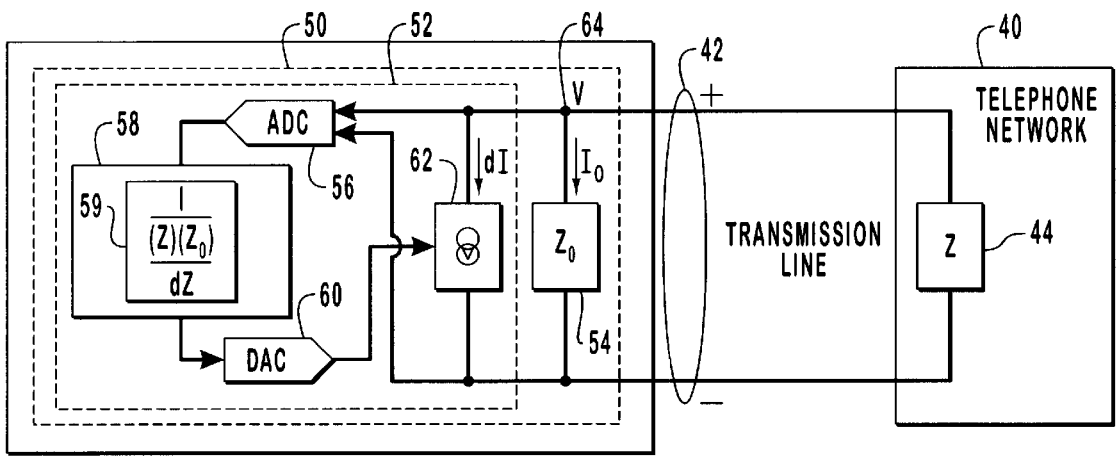
FIG. 4 is a schematic diagram of one embodiment of an impedance generator circuit for altering an impedance.

FIG. 4 is a schematic diagram illustrating how an impedance is generated by impedance synthesis circuitry 52. Voltage V 64 of transmission line 42 is an example of an input voltage which is sampled and digitized by analog to digital converter (ADC) 56. ADC 56 is an example of means for determining an input voltage. The digital output of ADC 56 is scaled and processed by digital signal processor (DSP) 58. The digital output, which is a scaled voltage, is converted to its analog equivalent by digital to analog converter (DAC) 60. The output of DAC 60 drives or controls voltage to current converter 62. DSP 58 comprises an impedance generator 59, which is configured in software to scale and process the digitized voltage V 64. In this embodiment, impedance generator is configured to scale voltage V 64 by a factor of $1/[(Z)(Z_o)/dZ]$.

Voltage to current converter 62 is a voltage controlled current source and produces a current having a magnitude related to the inverse of the generated impedance. In this manner the total current in interface circuitry 50 is:

$$I = I_o + dI = V/Z_o + V/[(Z)(Z_o)/dZ] = V[1/Z_o + dZ/(Z)(Z_o)] = V/Z; \quad (5)$$

and $$I = V/Z \text{ or } Z = V/I \quad (6)$$

as required.

In other words, the current generated by voltage to current converter 62 has a value such that characteristic impedance Z 44 is matched by termination circuitry 50 even though only nominal impedance $Z_o$ 54 is physically present. The impedance generated by impedance synthesis circuitry 52, when combined in parallel with nominal impedance $Z_o$ 54, creates or results in an effective termination impedance having a value substantially equivalent to characteristic impedance Z 44.

Impedance generator 59 is usually implemented in software which permits more than one impedance to be generated by termination circuitry 50. This is especially advantageous in environments or systems such as the various telephone networks which have different impedances which must be matched for efficient data transfer.

The advantages of the present invention are several. The need to switch to the circuit components providing the proper termination to the driving source is eliminated. Manufacturing costs are reduced because all of the different termination circuits are reduced to the impedance generation circuitry. A further advantage is evident in technologies such as PCMCIA cards where the surface area of the printed circuit board (PCB) is extremely valuable. The present invention requires less PCB area than a plurality of termination circuits.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system having a transmission line and a characteristic impedance, a circuit for creating a termination impedance, the circuit comprising:
   a nominal impedance placed across the transmission line;
   a means for determining an input voltage of the transmission line;

a means for scaling the input voltage by a factor to produce a scaled voltage, wherein the factor is related to the characteristic impedance; and a current source for generating a current across the transmission line, wherein the current source is controlled by the scaled voltage such that a generated impedance is created in parallel with the nominal impedance, wherein the parallel combination of the generated impedance and the nominal impedance creates a termination impedances that substantially matches the characteristic impedance.

2. A circuit as defined in claim 1, wherein the means for determining an input voltage further comprises an analog to digital converter.

3. A circuit as defined in claim 1, wherein the means for scaling the input voltage further comprises an impedance generator.

4. A circuit as defined in claim 3, wherein the impedance generator is implemented in software and is capable of multiplying the input voltage by one or more factors.

5. A circuit as defined in claim 1, further comprising a digital to analog converter for converting the scaled voltage to an analog equivalent, wherein the analog equivalent is connected between the means for scaling and the current source.

6. A circuit as defined in claim 1, wherein the current source generates a current having a magnitude inversely related to the generated impedance.

7. A circuit as defined in claim 1, wherein the generated impedance has a value substantially equal to the characteristic impedance multiplied by the termination impedance divided by the difference between the characteristic impedance and the termination impedance.

8. A circuit for substantially matching a characteristic impedance of a transmission line with a termination impedance, the circuit comprising:

a nominal impedance placed across the transmission line; and an impedance generator circuit electrically connected across the transmission line in parallel with the nominal impedance, wherein the impedance generator circuit comprises:

a digital signal processor which receives and digitizes an input voltage from the transmission line, wherein the digital signal processor comprises a generator; and a current source for producing a current whose value is controlled by the digitized input voltage, wherein the current creates a generated impedance across the transmission line, wherein the termination impedance is altered by the generated impedance.

9. A circuit as defined in claim 8, further comprising an analog to digital converter electrically connected to the digital signal processor, wherein the analog to digital converter converts the input voltage to its digital equivalent.

10. A circuit as defined in claim 8, wherein the generator scales the digitized input voltage by a scaling factor.

11. A circuit as defined in claim 8, wherein the generator is implemented in software and is capable of scaling the input voltage by more than one scaling factor.

12. A circuit as defined in claim 11, wherein the scaling factor is equal to the difference between the characteristic impedance and the termination impedance divided by the characteristic impedance multiplied by the termination impedance.

13. A circuit as defined in claim 8, wherein the digital signal processor produces a scaled voltage, wherein the scaled voltage controls the current source.

14. A circuit as defined in claim 8, wherein the generated impedance has a value substantially equal to the characteristic impedance multiplied by the termination impedance divided by the difference of the characteristic impedance and the termination impedance.

15. A circuit as defined in claim 8, wherein the terminated impedance, when combined with the generated impedance, has a value substantially equal to the characteristic impedance.

16. A circuit as defined in claim 8, further comprising a digital to analog converter, wherein the digital to analog converter converts the scaled voltage to its analog equivalent, wherein the digital to analog converter is connected between the generator and the current source.

17. A termination circuit for substantially matching a characteristic impedance of a telephone network having a transmission line, the termination circuit comprising:

a nominal impedance placed across the transmission line;

an analog to digital converter electrically connected to the transmission line for receiving an input voltage from the telephone network, wherein the analog to digital converter converts the input voltage to its digital equivalent;

an impedance generator circuit electrically connected to the analog to digital converter, wherein the impedance generator circuit receives the digitized input voltage and produces a scaled voltage;

a digital to analog converter electrically connected to the impedance generator circuit for converting the scaled voltage to its analog equivalent; and a current source electrically connected to the digital to analog converter, wherein the current produced by the current source is controlled by the analog scaled voltage such that a generated impedance is created across the transmission line in parallel with the nominal impedance such that the parallel combination of the nominal impedance and the generated impedance produces a termination impedance which substantially matches the characteristic impedance.

18. A circuit as defined in claim 17, wherein the current produced by the current source has a value related to the inverse of the generated impedance.

19. A circuit as defined in claim 17, wherein the generated impedance is in parallel with the termination impedance.

20. A circuit as defined in claim 17, wherein the impedance generator circuit further comprises a generator.

21. A circuit as defined in claim 20, wherein the generator is implemented in software and scaled the input voltage by a factor.

22. A circuit as defined in claim 21, wherein the factor is related to the generated impedance.

23. A circuit for altering a nominal impedance to match a characteristic impedance of a system having a transmission line, the circuit comprising:

an impedance generator circuit electrically connected across the transmission line in parallel with the nominal impedance, wherein the impedance generator circuit comprises:

a digital signal processor which receives an input voltage from the transmission line;

an impedance generator which scales the input voltage; and a current source for producing a current whose value is controlled by the scaled input voltage, wherein the current creates a generated impedance across the transmission line, wherein the nominal impedance is altered by the generated impedance such that it matches the characteristic impedance.

24. A circuit as defined in claim 23, wherein the input voltage is scaled by a factor of the difference between the characteristic impedance and the nominal impedance divided by the product of the characteristic impedance and the nominal impedance.

25. A circuit as defined in claim 23, wherein the generated impedance is in parallel with the nominal impedance across the transmission line.

* * * * *